(12) United States Patent
Zhang

(10) Patent No.: US 11,512,619 B2
(45) Date of Patent: Nov. 29, 2022

(54) ELECTRIC HEATED CATALYST ARRANGEMENT

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/239,190

(22) Filed: Apr. 23, 2021

(65) Prior Publication Data
US 2022/0341353 A1    Oct. 27, 2022

(51) Int. Cl.
*F01N 3/28* (2006.01)
*F01N 3/20* (2006.01)
*B01D 53/94* (2006.01)

(52) U.S. Cl.
CPC .......... *F01N 3/2006* (2013.01); *B01D 53/94* (2013.01); *F01N 3/2803* (2013.01)

(58) Field of Classification Search
CPC ...... F01N 3/2006; F01N 3/2803; B01D 53/94

USPC ........................................ 422/174
See application file for complete search history.

(56) References Cited

U.S. PATENT DOCUMENTS

| | | | |
|---|---|---|---|
| 5,234,668 A * | 8/1993 | Harada | F01N 3/2026 428/116 |
| 5,865,864 A | 2/1999 | Bruck | |
| 6,938,330 B2 * | 9/2005 | Haws | B65D 33/2541 29/33.2 |
| 8,071,038 B2 | 12/2011 | Girard et al. | |
| 2015/0337711 A1 | 11/2015 | Plati et al. | |

FOREIGN PATENT DOCUMENTS

CN              110206622 A        9/2019

* cited by examiner

*Primary Examiner* — Tom P Duong
(74) *Attorney, Agent, or Firm* — Vincent Mastrogiacomo; Brooks Kushman P.C.

(57) ABSTRACT

An automotive exhaust system includes an exhaust pipe and a catalytic converter. The catalytic converter includes a catalyst in fluid communication with the exhaust pipe, and an electric heater between the exhaust pipe and the catalyst. The electric heater includes a cellular structure that defines a plurality of smaller and larger cells. The smaller cells occupy a contiguous half of the cellular structure.

10 Claims, 12 Drawing Sheets

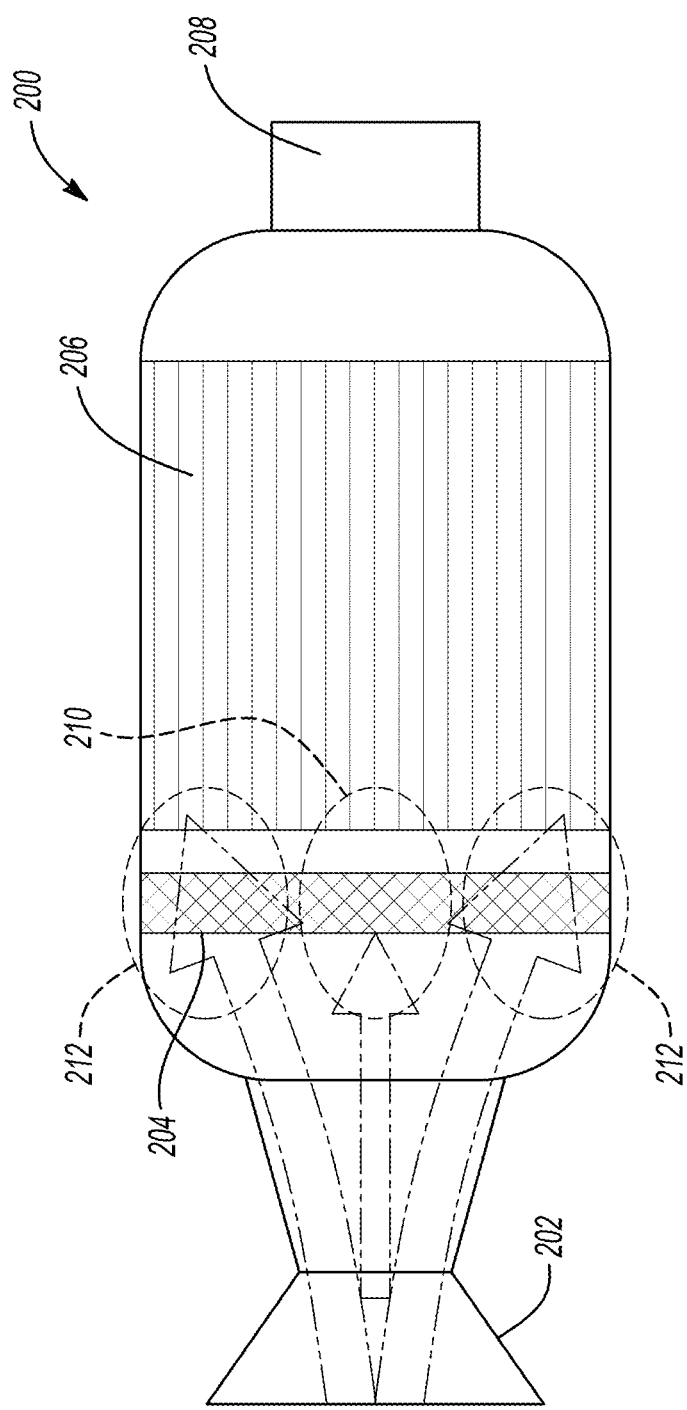

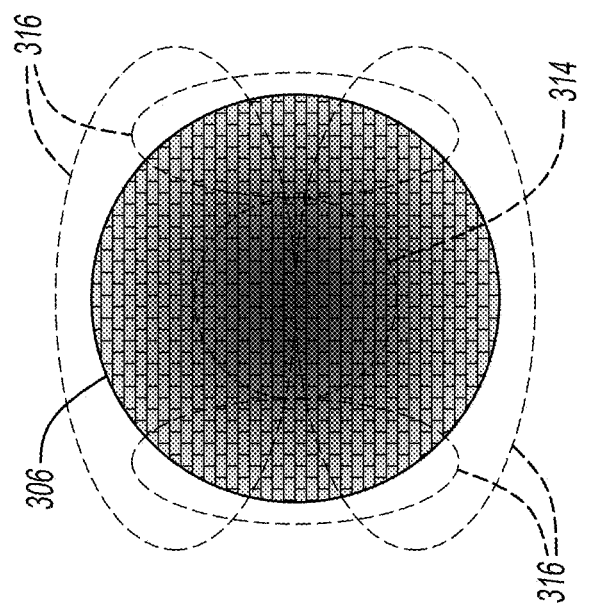
_Fig-6C_
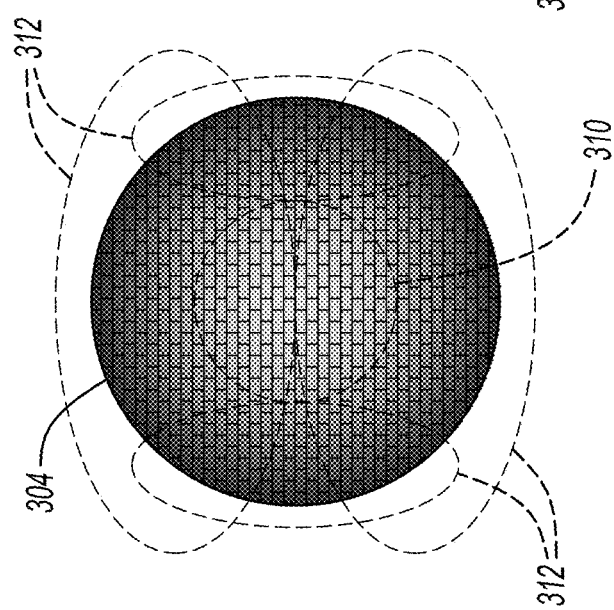
_Fig-6B_
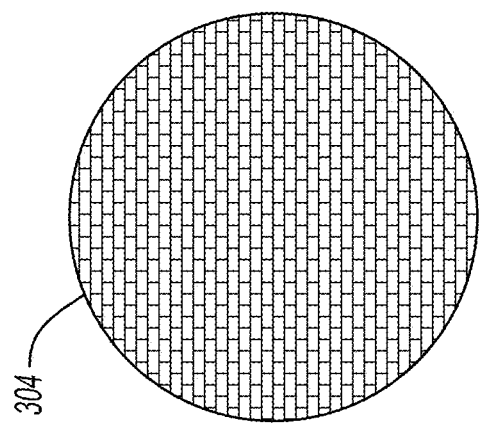
_Fig-6A_

US 11,512,619 B2

ELECTRIC HEATED CATALYST ARRANGEMENT

TECHNICAL FIELD

The present disclosure relates to an electric heated catalyst (eCAT) system for improving emissions conversion at engine cold start.

BACKGROUND

Cold start engine emissions are responsible for a significant portion of a vehicle's total emissions. In fact, as much as one third of total emissions in a Federal Test Procedure cycle (FTP) may be attributed to the engine cold start. Electric Heated Catalyst ("eCAT") systems are a promising newly developed technology that have the potential to reduce cold start emissions by increasing catalytic converter efficiency.

SUMMARY

A catalytic converter includes a catalyst in fluid communication with an exhaust pipe, and an electric heater upstream of the catalyst and having a cellular structure that is more dense in certain areas than other areas such that flow of exhaust gas is restricted through the certain areas relative to the other areas and redirected through the other areas to promote uniform exhaust gas flow through the cellular structure and catalyst, and uniform temperature distribution across the cellular structure and within the catalyst.

An automotive exhaust system includes an exhaust pipe and a catalytic converter. The catalytic converter includes a catalyst in fluid communication with the exhaust pipe, and an electric heater between the exhaust pipe and the catalyst. The electric heater includes a cellular structure that defines a plurality of smaller and larger cells and wherein the smaller cells occupy a contiguous half of the cellular structure.

An automotive exhaust system includes an exhaust pipe and a catalytic converter. The catalytic converter includes a catalyst in fluid communication with the exhaust pipe, and an electric heater between the exhaust pipe and the catalyst. The electric heater includes a cellular structure that defines a plurality of smaller and larger cells.

BRIEF DESCRIPTION OF THE DRAWINGS

FIG. 3 shows an electric heater and a catalyst positioned downstream from a turbocharge system.

FIG. 6A shows a cell structure of a heater at its atmospheric temperature state when it is not subject to exhaust gas passage.

FIG. 6B shows a temperature distribution profile of the heater when it is electrically heated and subject to the passage of exhaust gas through a non-turbo system.

FIG. 6C shows a temperature distribution profile of a catalyst subject to the flow of exhaust gas after passage through the heater and the non-turbo system.

DETAILED DESCRIPTION

Figure 1:
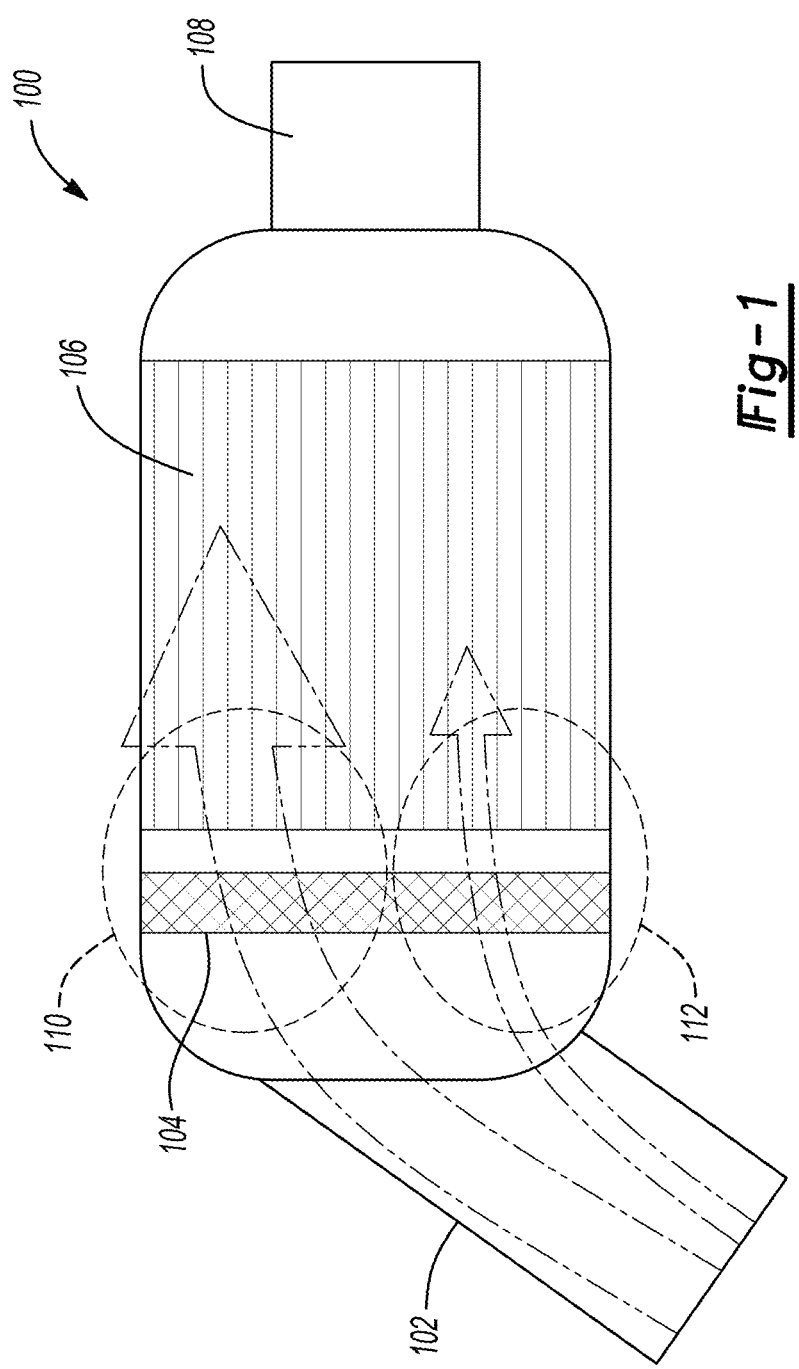
FIG. 1 shows an electric heater and a catalyst situated downstream from an angled cone.

The disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Catalytic converters are used in vehicles to convert gases produced from internal combustion engines. Catalytic converters are usually situated within the exhaust system of a vehicle downstream from the internal combustion engine. Two types of catalytic converters are commonly used in vehicles to reduce exhaustion of hazardous gases. These two are namely: two-way catalytic converters and three-way catalytic converters. A two-way catalytic converter has two simultaneous functions: i) oxidation of carbon monoxide to carbon dioxide; and ii) oxidation of hydrocarbons to carbon dioxide and water. Several oxidation catalysts such as platinum and palladium may be used to facilitate these oxidation reactions. Two-way catalytic converters, however, are not equipped to reduce exhaustion of nitrogen oxides. Accordingly, they are not as prevalent as three-way catalytic converters.

A three-way catalytic converter has three simultaneous functions: i) oxidation of carbon monoxide to carbon dioxide; ii) oxidation of hydrocarbons to carbon dioxide and water; and iii) reduction of nitrogen oxides to nitrogen and oxygen. Platinum and rhodium are commonly used to facilitate the reduction reaction while platinum and palladium are usually used to facilitate the oxidation reaction. Since these reactions are most efficient at an optimum stoichiometric air fuel ratio, one or more oxygen sensors are usually disposed within a close-loop fuel injection feed-back system to measure the amount of oxygen and increase or decrease the air fuel ratio such that the engine is running at an optimum stoichiometric ratio.

Another factor that influences the efficiency of catalytic converters is temperature. Catalytic converters work best at high temperatures. In particular, catalytic converters are usually effective after they reach a minimum temperature necessary to initiate the above-mentioned catalytic reactions. This minimum temperature is commonly referred to as a "light-off temperature." More specifically, light-off temperature ($T_{50}$) refers to a temperature at which hydrocarbon conversion reaches 50%.

Because of this dependency on high temperatures, engine cold start emissions may be a significant portion of total emissions. As much as one third of total emissions in a Federal Test Procedure cycle (FTP) may come from the engine cold start. A possible issue with traditional cold start engine reduction (CSER) methods is high hydrocarbon emissions which may be caused by the fuel film formed on the cold surfaces of the cylinder wall and piston, by poor liquid film evaporation due to cold temperature, by lack of sufficient time for liquid film to be evaporated during intake and compression strokes, and liquid fuel (wall film) evaporation during exhaust stroke due to high combustion temperature inside the cylinder. To speed up catalyst temperature rise, catalytic converters are usually placed close to the engine.

Electric Heated Catalyst ("eCAT") systems are a promising newly developed technology for fast light-off of catalyst to improve emissions conversion efficiency at engine cold start. eCATs are external heaters (resistance heaters) that are placed in between an engine and a catalyst/catalytic converter. These eCATs generally have one or more heating elements that are energized via the application of electric power to further assist heating up the exhaust gas. Simply put, eCATs are used to speed up the process of achieving the light-off temperature. In conventional eCAT systems, because of the application of constant electric power to the heaters, heat generation is usually uniform across the heater. Exhaust gas flow across the heater, however, is generally not uniform. This is because exhaust gas flow (or fluid flow) characteristics are dependent on many factors including but not limited to the arrangement of an exhaust system's conduits facilitating the flow of gases. This mismatch reduces heater efficiency and can lead to heater damage.

In exhaust systems with an angled inlet cone in front of the eCAT system, for example, most exhaust gases flow toward the upper portion of the heater. Under this condition, the bottom portion of the heater may be overheated while the upper portion may not generate enough heat to warm up the exhaust gases. Similarly, in exhaust systems with a turbocharge system downstream from an eCAT system most exhaust gases swirl away from the center portion of the heater and toward the boundaries of the heater. Under this condition, the center portion of the heater may be overheated while the outer portion may not generate enough heat to warm up the exhaust gases. In exhaust systems with a non-turbo system downstream from an eCAT system most exhaust gases tend to pass through the center portion of the heater. Under this condition, the outer portion of the heater may overheat because of the lower cooling effect of the exhaust gases while the center portion may not generate enough heat to heat up the catalyst rapidly. These exhaust gases flow characteristics may reduce heater efficiency and as a result reduce conversion efficiency of catalytic converters. In some instances, temperature variations across the heater may lead to heater damage.

Figure 2C:
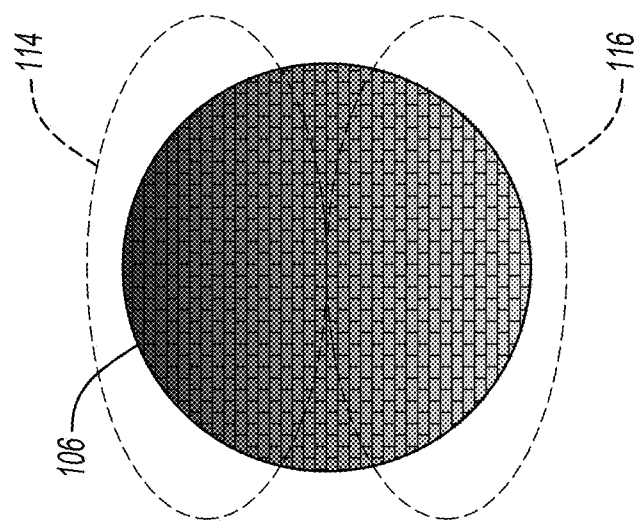
FIG. 2C shows a temperature distribution profile of a catalyst subject to the flow of exhaust gas after passage through the angled cone and the heater.
Figure 2B:
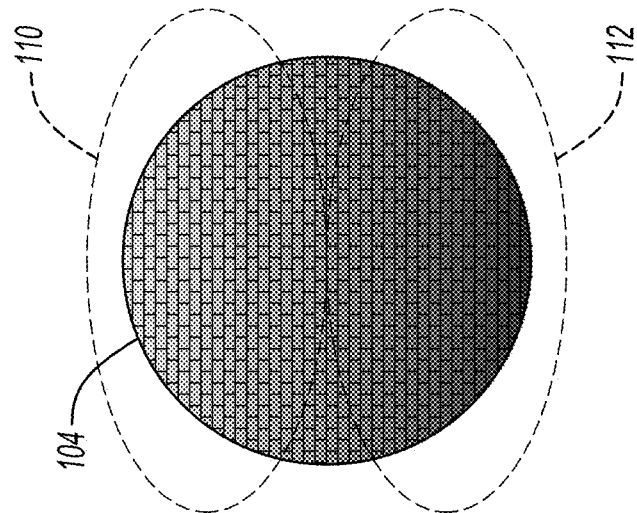
FIG. 2B shows a temperature distribution profile of the heater when it is electrically heated and subject to passage of exhaust gas through an angled cone.
Figure 2A:
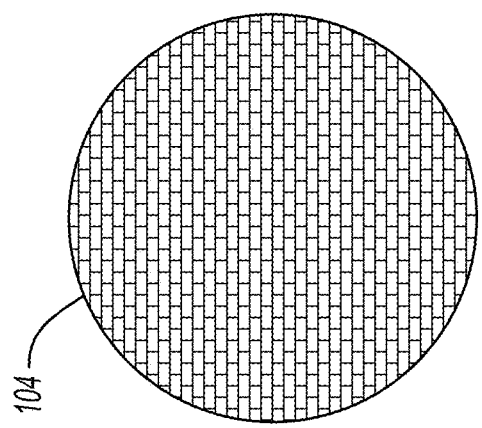
FIG. 2A shows a cell structure of a heater at its atmospheric temperature state when it is not subject to exhaust gas.

FIG. 1 shows a portion of an automotive exhaust system 100 with an angled inlet cone 102 upstream of an electric heater 104 positioned in between an engine (not shown) and a catalyst (or catalytic converter) 106. Exhaust gas generated by the engine flows from the engine through the heater 104 and catalyst 106 and is released after passing through one or more of resonator, muffler, and/or tail pipe (collectively 108). Under this exhaust gas conduit arrangement, most of the exhaust gas flowing through the angled cone 102 flows towards an upper portion 110 of the heater 104. As such, a bottom portion 112 of heater 104 may be overheated due to less cooling effect from the exhaust gas while the upper portion 110 of the heater 104 may not generate enough heat to heat up the exhaust gas. FIGS. 2A-2C demonstrate heat temperature profiles of the heater 104 and the catalyst 106 positioned downstream from the angled cone 102 facilitating release of the exhaust gas.

In particular, FIG. 2A shows the cell structure of the heater 104 at its atmospheric temperature state when it is not subject to exhaust gas. FIG. 2B demonstrates the temperature distribution profile of the heater 104 when it is electrically heated and subject to the passage of exhaust gas. This figure shows that because most of the exhaust gas flowing through the angled cone 102 flows toward the upper portion 110 of the heater 104, the upper portion 110 exhibits lower temperatures than intended because of the cooling effects of the exhaust gas. Similarly, this figure shows that due to the lower flow rate of exhaust gas through the bottom portion 112 of the heater 104, the bottom portion 112 exhibits a higher than intended temperature because of the lower cooling effects of the exhaust gas. FIG. 2C demonstrates the temperature distribution profile of the catalyst 106 subject to the flow of exhaust gas after passage through the heater 104. This figure shows that as a result of most of the exhaust gas having passed through the upper portion 110 of the heater 104, a top portion 114 of the catalyst 106 exhibits a high temperature while a bottom portion 116 of the catalyst 106 exhibits a low temperature. This non-uniform temperature profile may result in a lower-than-optimal hazardous gas convention efficiency. This lower efficiency may be attributed to the longer time it takes for the bottom portion 116 of the catalyst 106 to reach its light-off temperature.

Figure 4C:
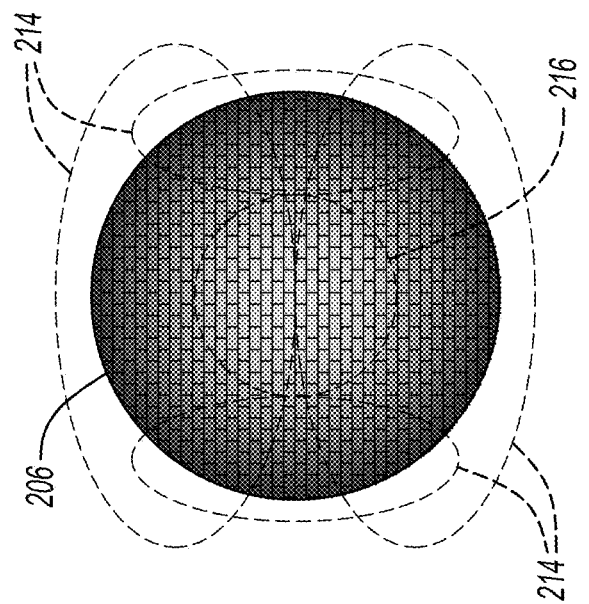
FIG. 4C shows a temperature distribution profile of a catalyst subject to the flow of exhaust gas through a turbocharge system after passage through the heater.
Figure 4B:
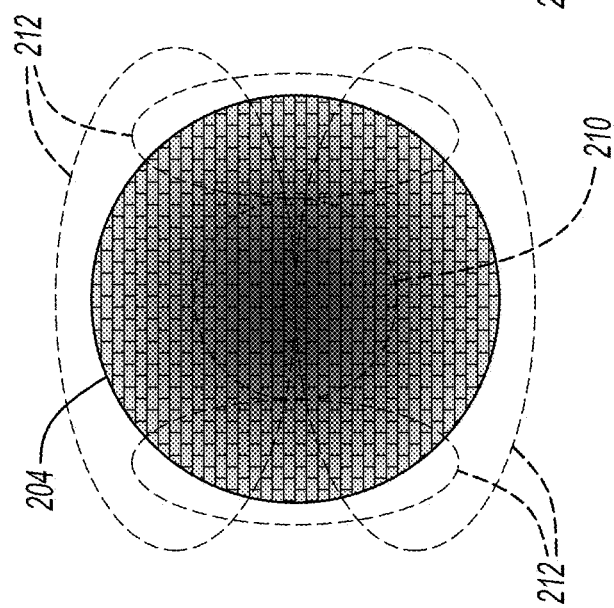
FIG. 4B shows a temperature distribution profile of the heater when it is electrically heated and subject to passage of exhaust gas through a turbocharge system.
Figure 4A:
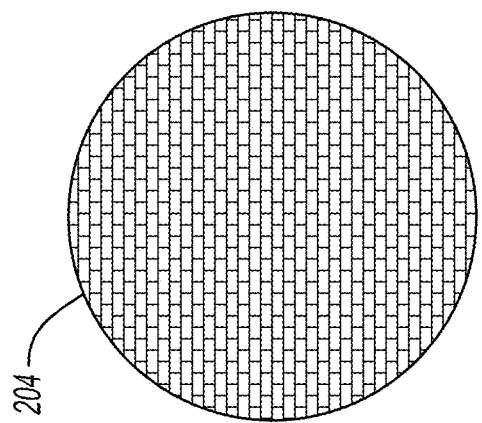
FIG. 4A shows a cell structure of a heater at its atmospheric temperature state when it is not subject to exhaust gas.

FIG. 3 shows a portion of an automotive exhaust system 200 having an electric heater 204 and a catalyst 206 downstream from a turbocharge system 202. The portion of the exhaust system 200 shown facilitates the passage of exhaustion gas from an engine (not shown) through the electric heater 204, the catalyst 206, and through one or more of resonator, muffler, and/or tail pipe (collectively 208). Under this exhaust gas conduit arrangement, most of the exhaust gas flowing through the turbocharge system 202 swirls away from a center portion 210 of the heater 204 and toward outer portions 212 of the heater 204. As such, the center portion 210 of the heater 204 may be overheated while the outer portions 212 may not generate enough heat to heat up the exhaust gas. FIGS. 4A-4C demonstrate heat temperature profiles of the heater 204 and the catalyst 206 positioned downstream from the turbocharge system 202 facilitating release of the exhaust gas.

In particular, FIG. 4A shows the cell structure of the heater 204 at its atmospheric temperature state when it is not subject to exhaust gas. FIG. 4B demonstrates the temperature distribution profile of the heater 204 when it is electrically heated and subject to the passage of exhaust gas. This figure shows that because most of the exhaust gas flowing through the turbocharge system 202 flows toward the outer portions 212 of the heater 204, the outer portions 212 exhibit lower temperatures than intended because of the cooling effects of the exhaust gas. Similarly, this figure shows that due to the lower flow rate of exhaust gas through the center portion 210 of the heater 204, the center portion 210 exhibits a higher than intended temperature because of the lower cooling effects of the exhaust gas. FIG. 4C demonstrates the temperature distribution profile of the catalyst 206 subject to the flow of exhaust gas after passage through the heater 204. This figure shows that as a result of most of the exhaust gas having passed through outer portions 212 of the heater 204, peripheral portions 214 of the catalyst 206 exhibits a high temperature while a central portion 216 of the catalyst 206 exhibits a low temperature. This non-uniform temperature profile may result in a lower-than-optimal hazardous gas convention efficiency. This lower efficiency may be attributed to the longer time it takes for the central portion 216 of the catalyst 206 to reach its light-off temperature.

Figure 5:
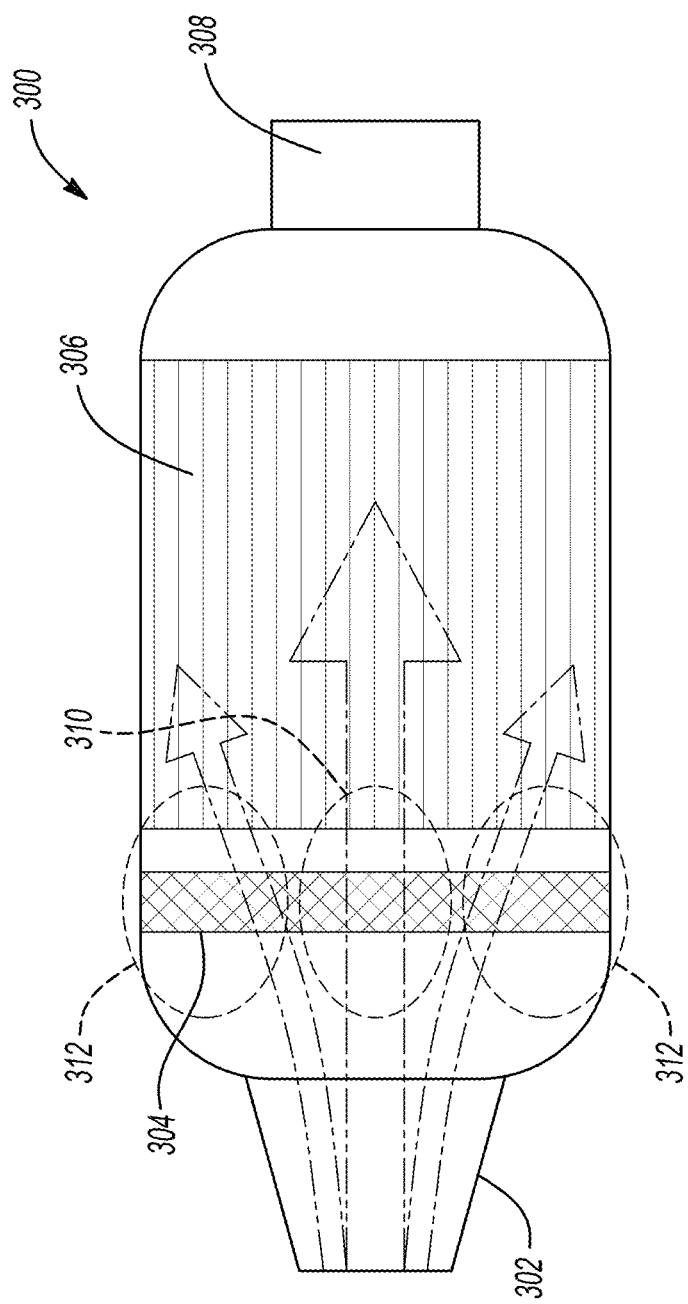
FIG. 5 shows an electric heater and a catalyst positioned downstream from a non-turbo system.

FIG. 5 shows a portion of an automotive exhaust system 300 having an electric heater 304 and a catalyst 306 downstream from a non-turbo system 302. The portion of the exhaust system 300 shown facilitates the passage of exhaust gas from an engine (not shown) through the electric heater 304, the catalyst 306, and through one or more of resonator, muffler, and/or tail pipe (collectively 308). Under this exhaust gas conduit arrangement, most of the exhaust gas flowing through the non-turbo system 302 passes through a center portion 310 of the heater 304. As such, the outer portion 312 of the heater 304 may be overheated while the center portions 310 may not generate enough heat to warm up the exhaust gas. FIGS. 6A-6C demonstrate heat temperature profiles of the heater 304 and the catalyst 306 positioned downstream from the non-turbo system 302 facilitating release of the exhaust gas.

In particular, FIG. 6A shows the cell structure of the heater 304 at its atmospheric temperature state when it is not subject to exhaust gas. FIG. 6B demonstrates the temperature distribution profile of the heater 304 when it is electrically heated and subject to the passage of exhaust gas. This figure shows that because most of the exhaust gas flowing through the non-turbo system 302 flows toward the center portions 310 of the heater 304, the center portion 310 exhibits lower temperatures than intended because of the cooling effects of the exhaust gas. Similarly, this figure shows that due to the lower flow rate of exhaust gas through the outer portion 312 of the heater 304, the outer portion 312 exhibits a higher than intended temperature because of the lower cooling effects of the exhaust gas. FIG. 6C demonstrates the temperature distribution profile of the catalyst 306 subject to the flow of exhaust gas after passage through the heater 304. This figure shows that as a result of most of the exhaust gas having passed through the center portion 310 of the heater 304, a central portion 314 of the catalyst 306 exhibits a high temperature while peripheral portions 316 of the catalyst 306 exhibit a low temperature. This non-uniform temperature profile may result in a lower-than-optimal hazardous gas convention efficiency. This lower efficiency may be attributed to the longer time it takes for the peripheral portions 316 of the catalyst 306 to reach its light-off temperature.

To remedy one or more of the above-mentioned issues, a multi sectional, multi region heater system is proposed. In other words, in a catalytic converter with a catalyst in fluid communication with an exhaust pipe, an electric heater having a cellular structure that is more dense in certain areas than other areas with different exposed surface areas and porosities may be adopted. This varying cellular structure may restrict the flow of exhaust gas through the certain areas relative to the other areas and redirect flow through the other areas to promote uniform exhaust gas flow through the electric heater and a catalyst, and uniform temperature distribution across the cellular structure and within the catalyst. In an exhaust system with an electric heater and a catalyst downstream from an angled cone, for example, an area occupying an upper half of a substantially circular cellular structure may have a smaller gas passage with larger surface area while the other areas occupying a lower half of a substantially circular cellular structure may have a larger gas passage with smaller surface area. The upper heater area may have a larger surface area due to denser gas passage while the lower heater area may have a smaller surface area due to coarse gas passages. The smaller gas passage (lower porosity) of the upper heater area may be used to increase the exhaust gas flow resistance through the upper heater area and redirect portions of the exhaust gas to the lower heater area. This multi sectional, multi-regional heater system may be adopted to compensate for the flow characteristics of exhaust gas through an angled cone exhausts gas conduit. In an eCAT system downstream from an angled cone, the upper half heater with smaller gas passage and larger surface area redirects some of the exhaust gas which would have otherwise tend to pass through the upper half heater, through the lower half heater thereby evenly distributing the load between the two areas. With even distribution of gas flow through the two areas, applied electric power may be adjusted for each area through a control unit to ensure that both areas generate same amount of heat.

In another embodiment, corresponding to an eCAT system downstream from a turbocharge system, for example, an area occupying a perimeter of a substantially circular cellular structure may have a smaller gas passage with larger surface area while the other areas occupying a center of a substantially circular cellular structure may have a larger gas passage with smaller surface area. The perimeter heater area may have a larger surface area due to denser gas passage while the center heater area may have a smaller surface area due to coarse gas passages. The smaller gas passage (lower porosity) of the perimeter heater area may be used to increase the exhaust gas flow resistance through the perimeter heater area and redirect portions of the exhaust gas to the central heater area. This multi sectional, multi-regional heater system may be adopted to compensate for the flow characteristics of exhaust gas through a turbocharge system exhaust gas conduit. In other words, this arrangement may be adopted for catalytic converters that are situated downstream from a venturi. In some embodiments with an eCAT system downstream from a turbocharge system, the perimeter heater area with smaller gas passage and larger surface area redirects some of the exhaust gas which would have otherwise tended to pass through the permitter area, through the central heater area thereby evenly distributing the load between the two areas. With even distribution of gas flow through the two areas, applied electric power may be adjusted for each area through a control unit to ensure that both areas generate same amount of heat.

In yet another embodiment, corresponding to an eCAT system downstream from a non-turbo system, for example, an area occupying a center portion of a substantially circular cellular structure may have a smaller gas passage with larger surface area while the other areas occupying a perimeter of a substantially circular cellular structure may have a larger gas passage with smaller surface area. The central heater area may have a larger surface area due to denser gas passage while the perimeter heater area may have a smaller surface area due to coarse gas passages. The smaller gas passage (lower porosity) of the central heater area may be used to increase the exhaust gas flow resistance through the center heater area and redirect portions of the exhaust gas to the perimeter area. This multi sectional, multi-regional heater system may be adopted to compensate for the flow characteristics of exhaust gas through a non-turbo system exhausts gas conduit. In other words, this arrangement may be adopted for catalytic converters that are situated downstream from a non-turbo system. In some embodiments with an eCAT system downstream from a non-turbo system, the central heater area with smaller gas passage and larger surface area redirects some of the exhaust gas which would have otherwise tend to pass through the central area, through the perimeter heater area thereby evenly distributing the load between the two areas. With even distribution of gas flow through the two areas, applied electric power may be adjusted for each area through a control unit to ensure that both areas generate same amount of heat.

Figure 7:
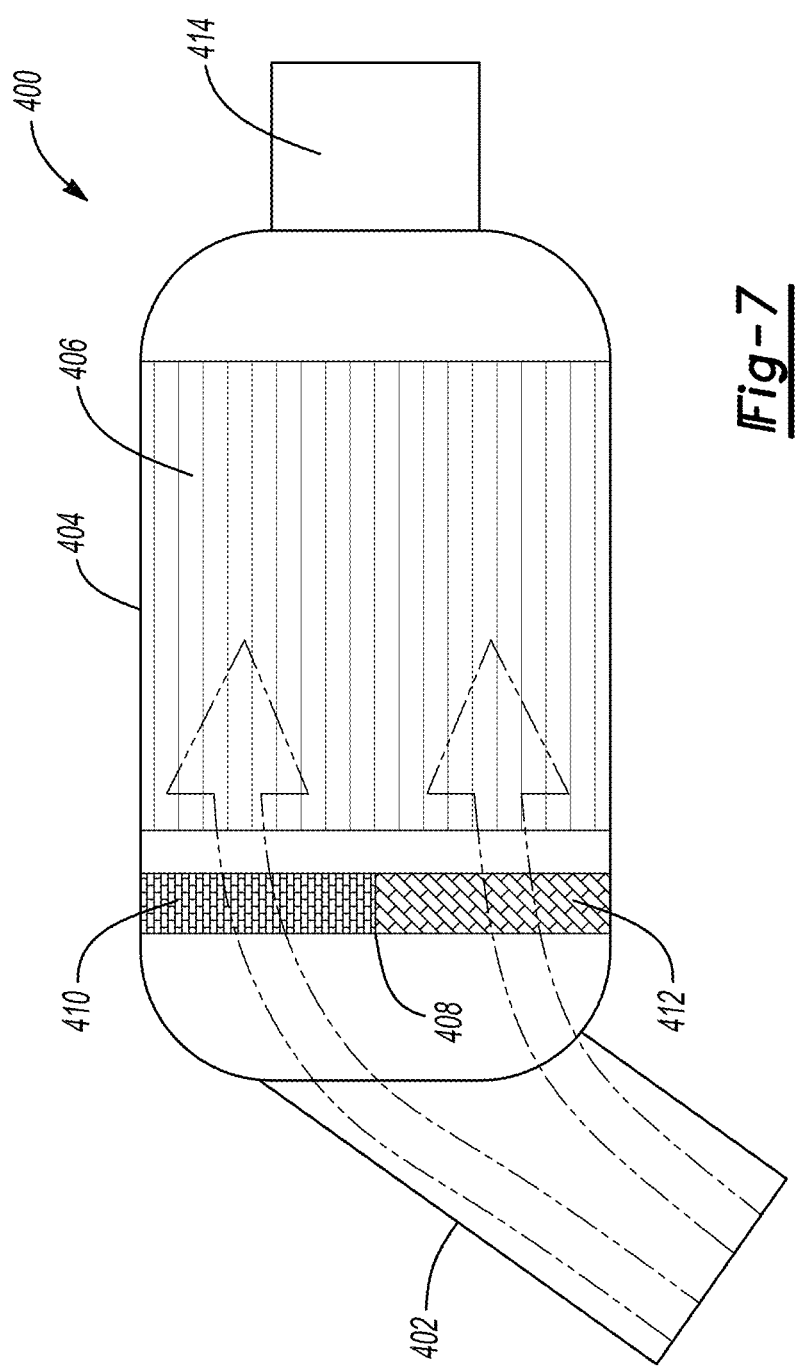
FIG. 7 shows an angled inlet cone upstream of an electric heater having a cellular structure defining a first electric heater area and a second electric heater area wherein the electric heater is positioned in between the angled inlet cone and a catalyst.

FIG. 7 shows a portion of an automotive exhaust system 400 with an angled cone inlet exhaust pipe 402 upstream of a catalytic converter 404 including a catalyst 406 in fluid communication with the exhaust pipe 402, and an electric heater 408 between the exhaust pipe 402 and the catalyst 406 wherein the electric heater 408 includes a cellular structure that defines a plurality of smaller cells 410 and larger cells 412 and wherein the smaller cells 410 occupy a contiguous half of the cellular structure. In some embodiments, the cellular structure has a circular cross-sectional area. Exhaust gas generated by the engine (not shown) flows from the engine through both the smaller cells 410 and larger cells 412 of the heater 408 and subsequently flows through the catalyst 406 and is released after passing through one or more of resonator, muffler, and/or tail pipe (collectively 414). Under this exhaust gas conduit arrangement, most of the exhaust gas flowing through the angled cone exhaust pipe 402 flows towards the smaller cells 410 while the larger cells 412 experience a lower flow of exhaust gas. In such embodiments, the exhaust pipe and the catalytic converter are not axially aligned. In some embodiments, the smaller cells 410 of the heater 408 having a smaller gas passage may have a larger surface area while the larger cells 412 of the heater 408 may have a smaller surface area.

The smaller cells 410 may have a larger surface area due to denser gas passage while the larger cells 412 may have a smaller surface area due to coarse gas passages. The smaller gas passage (lower porosity) cells 410 may be used to increase the exhaust gas flow resistance through the upper contiguous half 410 and redirect portions of the exhaust gas to the lower contiguous half 412. This multi sectional, multi heater system may be adopted to compensate for the flow characteristics of exhaust gas through an angled cone exhausts gas conduit. In an eCAT system downstream from an angled cone 402, the upper contiguous half 410 with smaller gas passage and larger surface area may redirect some of the exhaust gas which would have otherwise tend to pass through the upper continuous half 410, through the lower contiguous half 412 thereby substantially evenly distribute the load between the two areas. With even distribution of exhaust gas flow through the two areas, applied electric power may be adjusted for each area through a control unit to ensure that both areas generate same amount of heat.

Figure 8C:
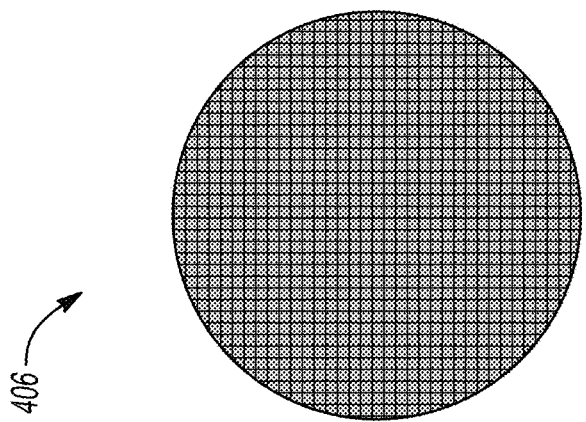
FIG. 8C shows a temperature distribution profile of a catalyst subject to the flow of exhaust gas after passage through the electric heater having a cellular structure defining a plurality of smaller cells and larger cells occupying upper and lower contagious halves.
Figure 8B:
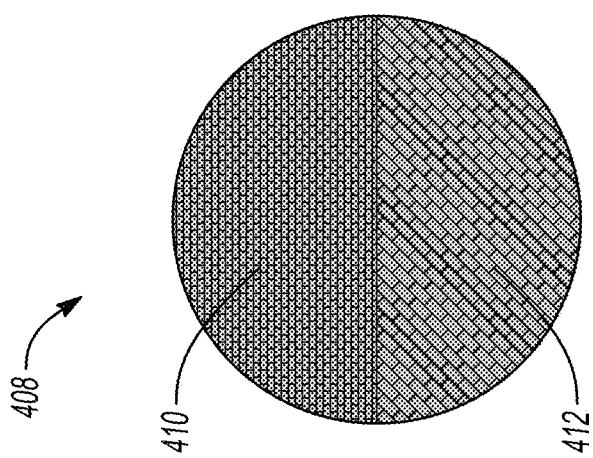
FIG. 8B shows a temperature distribution profile of the upper contiguous half and the lower half when electrically heated and subject to passage of exhaust gas through the angled cone.
Figure 8A:
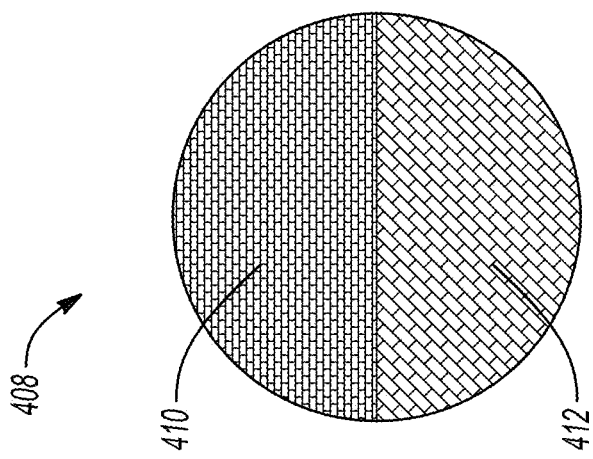
FIG. 8A shows a cell structure of an upper contiguous half and a lower contiguous half of an electric heater at its atmospheric temperature state when it is not subject to passage of exhaust gas through an angled cone.

FIG. 8A shows the cell structure of the upper contiguous half 410 and the lower contiguous half 412 of the heater 408 at its atmospheric temperature state when it is not subject to exhaust gas. As shown in FIG. 8A the upper contiguous half 410 may have a smaller gas passage with larger surface area in comparison with lower contiguous half 412. The smaller gas passage of the upper half 410 redirects some of the exhaust gas which would have otherwise tend to pass through the upper half 410, through the lower contiguous half 412 thereby substantially evenly distribute the load between the two areas. FIG. 8B demonstrates the temperature distribution profile of the upper contiguous half 410 and the lower half 412 when it is electrically heated and subject to the passage of exhaust gas. This figure shows that because some of the exhaust gas, tending to pass through the upper half 410, has now been redirected to the lower half 412, thereby substantially evenly distributing the flow, both areas experience the same amount of cooling effect from the flowing exhaust gas and exhibit substantially the same intended temperature profile. FIG. 8C demonstrates the temperature distribution profile of the catalyst 406 subject to the flow of exhaust gas after passage through the heater 408 having a cellular structure defining a plurality of smaller cells 410 and larger cells 412. This figure shows that as a result of substantially even passage of exhaust gas through the heater 408, the catalyst 406 exhibits a substantially even temperature profile distribution. In some embodiments, this uniform temperature profile may increase hazardous gas convention efficiency. This increase in efficiency may be attributed to the shorter-than-before amount of time it takes for the exhaust gas passing through the lower contiguous half 412 and subsequently the catalyst 406 to reach its light-off temperature.

Figure 9:
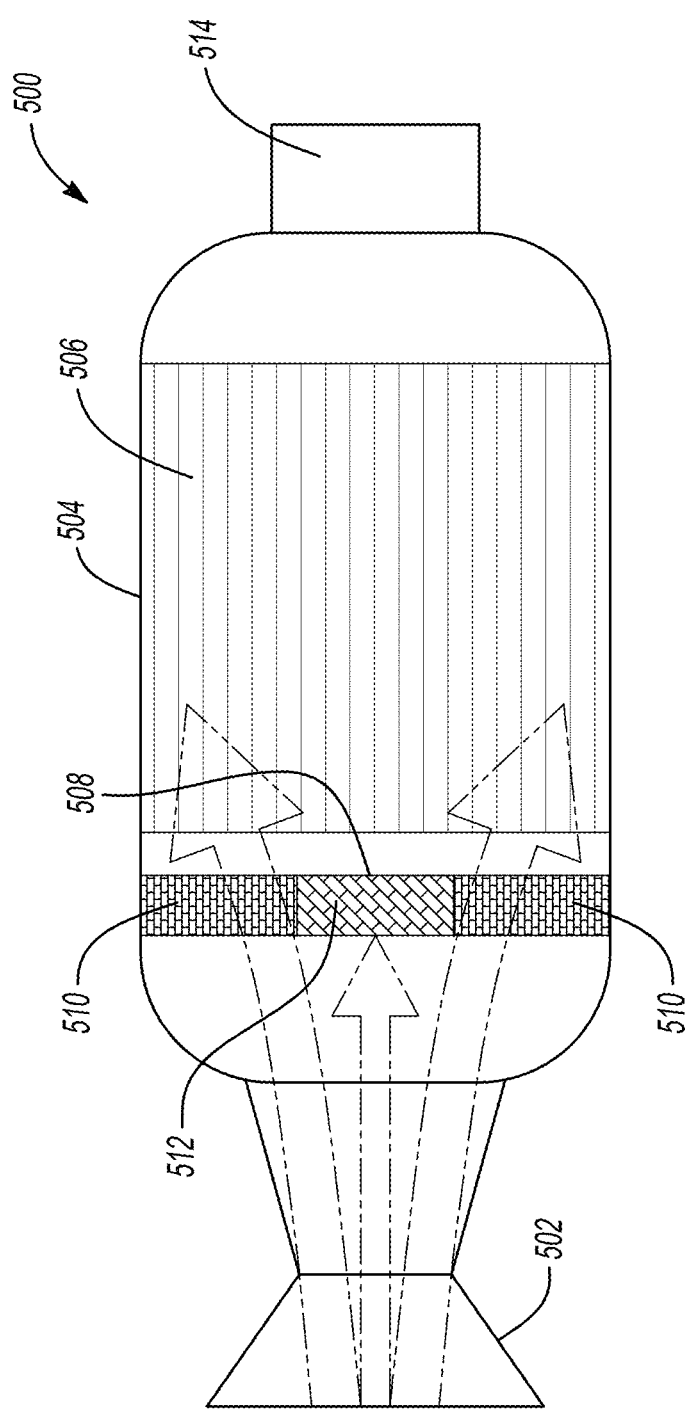
FIG. 9 shows a turbocharge system upstream of an electric heater having a cellular structure defining a first electric heater area and a second electric heater area wherein the electric heater is positioned in between the turbocharge system and a catalyst.

FIG. 9 shows a portion of an automotive exhaust system 500 with a turbocharge system and/or a venturi exhaust pipe 502 upstream of a catalytic converter 504 including a catalyst 506 in fluid communication with the exhaust pipe 502, and an electric heater 508 between the exhaust pipe 502 and the catalyst 506 wherein the electric heater 508 includes a cellular structure that defines a plurality of smaller cells 510 and larger cells 512 and wherein the smaller cells 510 occupy an outer annulus of the cellular structure. In some embodiments, the cellular structure has a circular cross-sectional area. Exhaust gas generated by the engine (not shown) flows from the engine through both the smaller cells 510 and larger cells 512 of heater 508 and subsequently flows through the catalyst 506 and is released after passing through one or more of resonator, muffler, and/or tail pipe (collectively 514). Under this exhaust gas conduit arrangement, most of the exhaust gas flowing through the venturi exhaust pipe 502 flows towards the smaller cells 510 while the larger cells 512 experience a lower flow of exhaust gas. In some embodiments, the smaller cells 510 of the heater 508 having a smaller gas passage may have a larger surface area while the larger cells 512 of the heater 508 may have a smaller surface area.

The smaller cells 510 may have a larger surface area due to denser gas passage while the larger cells 512 may have a smaller surface area due to coarse gas passages. The smaller gas passage (lower porosity) cells 510 may be used to increase the exhaust gas flow resistance through the outer annulus area housing the smaller cells 510 and redirect portions of the exhaust gas to a center area housing the larger cells 512 of the heater 508. This multi sectional heater system may be adopted to compensate for the flow characteristics of exhaust gas through a turbocharge exhausts and/or venturi gas exhaust conduits. In an eCAT system downstream from a turbocharger system (or a venturi pipe 502), the outer annulus housing the smaller cells 510 with smaller gas passage and larger surface area may redirect some of the exhaust gas which would have otherwise tend to pass through the smaller cells 510, through the center area housing the larger cells 512 thereby substantially evenly distribute the load between the two areas. With even distribution of exhaust gas flow through the two areas, applied electric power may be adjusted for each area through a control unit to ensure that both areas generate same amount of heat.

Figure 10C:
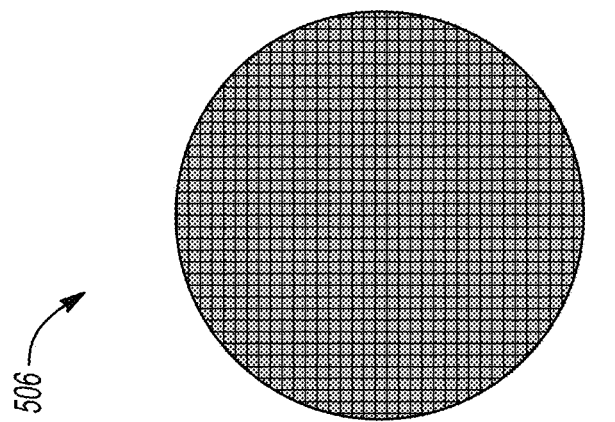
FIG. 10C shows a temperature distribution profile of a catalyst subject to the flow of exhaust gas after passage through the turbocharge system and the heater having a cellular structure defining a plurality of smaller and larger cells.
Figure 10B:
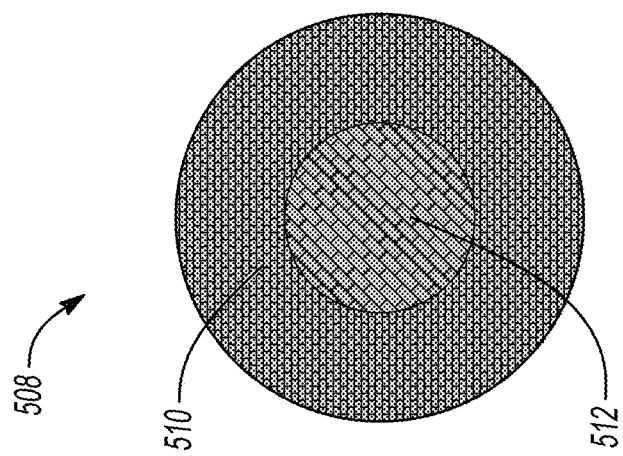
FIG. 10B shows a temperature distribution profile of the outer annulus and the center area when electrically heated and subject to the passage of exhaust gas through the turbocharge system.
Figure 10A:
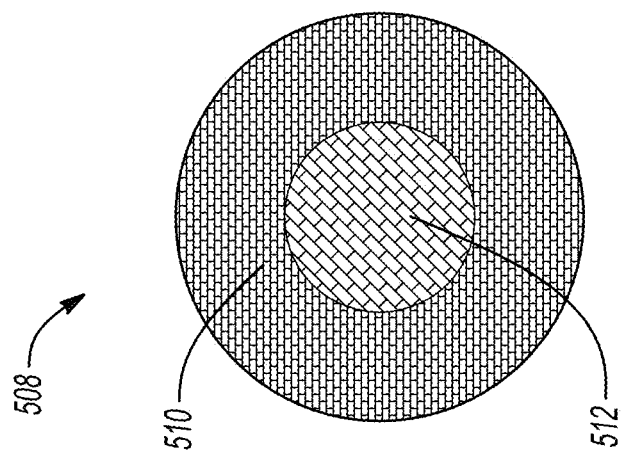
FIG. 10A shows a cell structure of an electric heater with an outer annulus area housing smaller cells and a center area housing larger cells at its atmospheric temperature state when it is not subject to exhaust gas passage through a turbocharge system.

FIG. 10A shows the heater 508 cell structure of the outer annulus housing the smaller cells 510 and the center area housing the larger cells 512 at its atmospheric temperature state when it is not subject to exhaust gas. As shown in FIG. 10A the outer annulus 510 may have a smaller gas passage with larger surface area in comparison with the center area 512. The smaller gas passage of the outer annulus housing the smaller cells 510 redirects some of the exhaust gas which would have otherwise tend to pass through the smaller cells 510, through the center area housing the larger cells 512 thereby substantially evenly distribute the load between the two areas. FIG. 10B demonstrates the temperature distribution profile of the outer annulus 510 and the center area 512 when it is electrically heated and subject to the passage of exhaust gas. This figure shows that because some of the exhaust gas, tending to pass through the outer annulus having the smaller cells 510, has now been redirected to the center area housing the larger cells 512, thereby substantially evenly distributing the flow, both areas experience the same amount of cooling effect from the flowing exhaust gas and exhibit substantially the same intended temperature profile. FIG. 10C demonstrates the temperature distribution profile of the catalyst 506 subject to the flow of exhaust gas after passage through the heater 508 having a cellular structure defining a plurality of smaller 510 and larger cells 512. This figure shows that as a result of substantially even passage of exhaust gas through the heater 508, the catalyst 506 exhibits a substantially even temperature profile distribution. In some embodiments, this uniform temperature profile may increase hazardous gas convention efficiency. This increase in efficiency may be attributed to the shorter-than-before amount of time it takes for the exhaust gas passing through the center area and subsequently the catalyst 506 to reach its light-off temperature.

Figure 11:
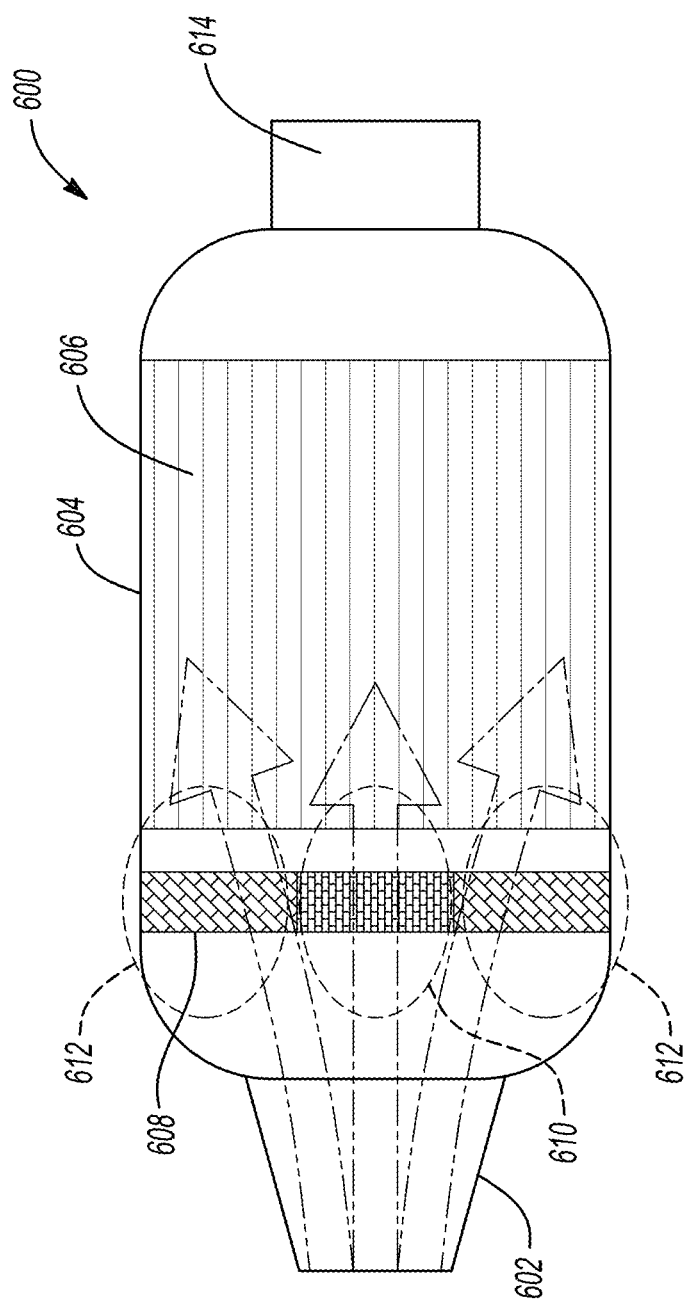
FIG. 11 shows a non-turbo system upstream of an electric heater having a cellular structure defining a first electric heater area and a second electric heater area wherein the electric heater is positioned in between the non-turbo system and a catalyst.

FIG. 11 shows a portion of an automotive exhaust system 600 with a non-turbo system 602 upstream of a catalytic converter 604 including a catalyst 606 in fluid communication with the exhaust pipe 602, and an electric heater 608 between the exhaust pipe 602 and the catalyst 606 wherein the electric heater 608 includes a cellular structure that defines a plurality of smaller cells 610 and larger cells 612 and wherein the smaller cells 610 occupy a central area of the cellular structure. In some embodiments, the cellular structure has a circular cross-sectional area and the exhaust pipe 602 is axially aligned with the electric heater 608 and/or with the catalytic converter 604. Exhaust gas generated by the engine (not shown) flows from the engine through both the smaller cells 610 and larger cells 612 of heater 608 and subsequently flows through the catalyst 606 and is released after passing through one or more of resonator, muffler, and/or tail pipe (collectively 614). Under this exhaust gas conduit arrangement, most of the exhaust gas flowing through the non-turbo exhaust pipe 602 flows towards the smaller cells 610 while the larger cells 612 experience a lower flow of exhaust gas. In some embodiments, the smaller cells 610 of the heater 608 having a smaller gas passage may have a larger surface area while the larger cells 612 of the heater 608 may have a smaller surface area.

The smaller cells 610 may have a larger surface area due to denser gas passage while the larger cells 612 may have a smaller surface area due to coarse gas passages. The smaller gas passage (lower porosity) cells 610 may be used to increase the exhaust gas flow resistance through the central area of the heater 608 housing the smaller cells 610 and redirect portions of the exhaust gas to an outer annulus area housing the larger cells 612 of the heater 608. This multi sectional heater system may be adopted to compensate for the flow characteristics of exhaust gas through a non-turbo exhaust gas exhaust conduit. In an eCAT system downstream from a non-turbo system 602, the central area of the heater 608 housing the smaller cells 610 with smaller gas passage and larger surface area may redirect some of the exhaust gas which would have otherwise tend to pass through the smaller cells 610, through the outer annulus area housing the larger cells 612 thereby substantially evenly distribute the load between the two areas. With even distribution of exhaust gas flow through the two areas, applied electric power may be adjusted for each area through a control unit to ensure that both areas generate same amount of heat.

Figure 12C:
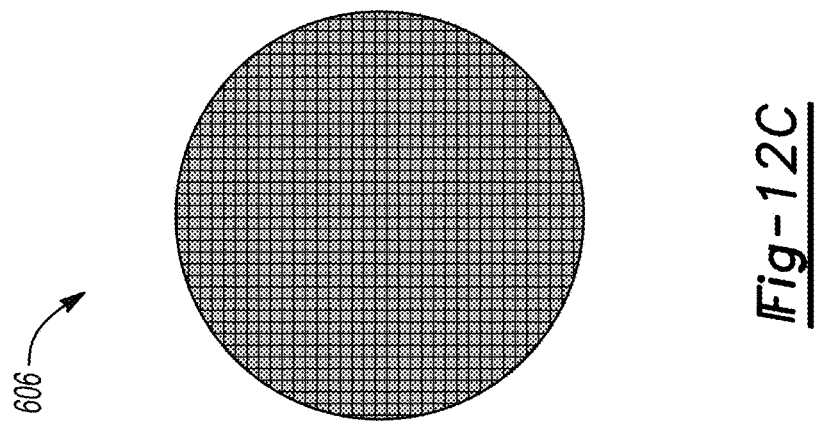
FIG. 12C shows a temperature distribution profile of a catalyst subject to the flow of exhaust gas after passage through the non-turbo system and the heater having a cellular structure defining a plurality of smaller and larger cells.
Figure 12B:
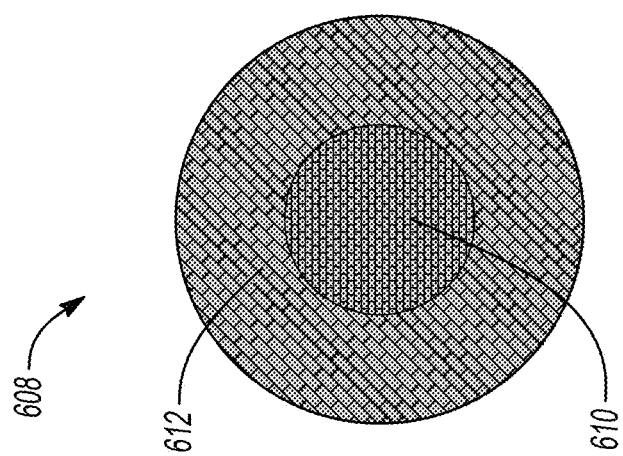
FIG. 12B shows a temperature distribution profile of the outer annulus and the center area when electrically heated and subject to the passage of exhaust gas through the non-turbo system.
Figure 12A:
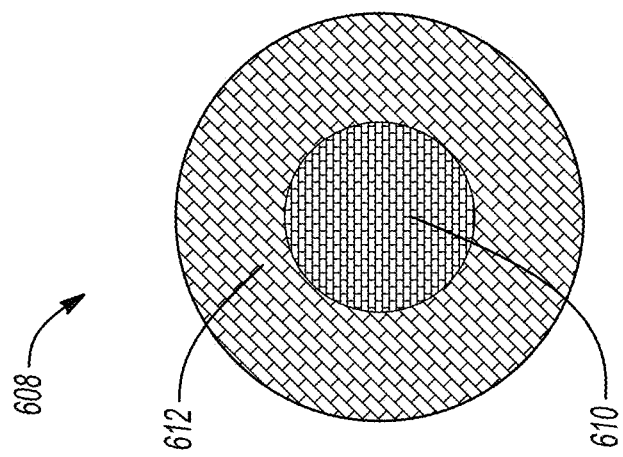
FIG. 12A shows a cell structure of an electric heater with an outer annulus area housing larger cells and a center area housing smaller cells at its atmospheric temperature state when it is not subject to exhaust gas passage through a non-turbo system.

FIG. 12A shows the central area housing the smaller cells 610 and the outer annulus area housing the larger cells 612 of the heater 608 at its atmospheric temperature state when it is not subject to exhaust gas passage. As shown in FIG. 12B the central area 610 may have a smaller gas passage with larger surface area in comparison to the outer annulus 612. The smaller gas passage of the central area of the heater 608 housing the smaller cells 610 redirects some of the exhaust gas which would have otherwise tend to pass through the smaller cells 610, through the outer annulus housing the larger cells 612 thereby substantially evenly distribute the load between the two areas. FIG. 12B demonstrates the temperature distribution profile of the center area with smaller cells 610 and the outer annulus area with larger cells 612 when electrically heated and subject to the passage of exhaust gas through a non-turbo system. This figure shows that because some of the exhaust gas, tending to pass through the central area having the smaller cells 610, have now been redirected to the outer annulus area housing the larger cells 612, thereby substantially evenly distributing the flow, both areas experience the same amount of cooling effect from the flowing exhaust gas and exhibit substantially the same intended temperature profile. FIG. 12C demonstrates the temperature distribution profile of the catalyst 606 subject to the flow of exhaust gas after passage through the non-turbocharge system 602 and the heater 608 having a cellular structure defining a plurality of smaller 610 and larger cells 612. This figure shows that as a result of substantially even passage of exhaust gas through the heater 608, the catalyst 606 exhibits a substantially even temperature profile distribution. In some embodiments, this uniform temperature profile may increase gas convention efficiency. This increase in efficiency may be attributed to the shorter-than-before amount of time it takes for the exhaust gas passing through the outer annulus area and subsequently the catalyst 606 to reach its light-off temperature.

Integration of an eCAT flow mixer and a heater having a cellular structure corresponding to an exhaust gas flow characteristic may also reduce packaging size constrains and the cost associated with conversion of hazardous gases to less-hazardous gases. Furthermore, in addition to increasing a vehicle's exhaust gas conversion efficiency, this integration may protect the eCAT system by eliminating the hot spots by promoting a uniform flow of exhaust gases. While this disclosure describes exemplary embodiments of the heater with a plurality of areas, it is to be understood that this disclosure also extends to embodiments with a plurality of heaters each having different cellular structure depending on the exhaust gas flow characteristics.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A catalytic converter comprising:
   a catalyst in fluid communication with an exhaust pipe; and
   an electric heater upstream of the catalyst and having a cellular structure that is more dense in certain areas than other areas such that flow of exhaust gas is restricted through the certain areas relative to the other areas and redirected through the other areas to promote uniform exhaust gas flow through the cellular structure and catalyst, and uniform temperature distribution across the cellular structure and within the catalyst, wherein the certain areas occupy a perimeter of the cellular structure and the other areas occupy a center of the cellular structure.

2. The catalytic converter of claim 1 wherein the certain areas occupy half of the cellular structure.

3. The catalytic converter of claim 2 wherein the cellular structure has a circular cross-sectional area.

4. The catalytic converter of claim 1 wherein the cellular structure has a circular cross-sectional area.

5. The catalytic converter of claim 1 further comprising a venturi upstream of the electric heater.

6. An automotive exhaust system comprising:
   an exhaust pipe; and
   a catalytic converter including a catalyst in fluid communication with the exhaust pipe, and an electric heater between the exhaust pipe and the catalyst, wherein the electric heater includes a cellular structure that defines a plurality of smaller and larger cells and wherein the smaller cells occupy a central area of the cellular structure.

7. The automotive exhaust system of claim 6 wherein the exhaust pipe further comprises a venturi upstream of the electric heater.

8. The automotive exhaust system of claim 6 wherein the smaller cells of the central area restrict flow of exhaust gas from the exhaust pipe therethrough relative to a rest of the cellular structure.

9. The automotive exhaust system of claim 6 wherein the cellular structure has a circular cross-sectional area.

10. The automotive exhaust system of claim 6 wherein the exhaust pipe and the electric heater are axially aligned.

* * * * *